(12) United States Patent
Lew

(10) Patent No.: US 9,854,415 B2
(45) Date of Patent: Dec. 26, 2017

(54) CALL CENTER A2P-TO-P2P MESSAGE ROUTING CONVERSION

(71) Applicant: HeyWire, Inc., Cambridge, MA (US)

(72) Inventor: Eugene Lee Lew, Olney, MD (US)

(73) Assignee: Heywire, Inc., Cambridge, MA (US)

( * ) Notice: Subject to any disclaimer, the term of this patent is extended or adjusted under 35 U.S.C. 154(b) by 0 days.

(21) Appl. No.: 14/700,325

(22) Filed: Apr. 30, 2015

(65) Prior Publication Data

US 2016/0323725 A1 Nov. 3, 2016

(51) Int. Cl.
*H04M 3/42* (2006.01)
*H04W 4/14* (2009.01)
*H04L 12/58* (2006.01)
*H04M 3/51* (2006.01)

(52) U.S. Cl.
CPC ............ *H04W 4/14* (2013.01); *H04L 51/12* (2013.01); *H04L 51/14* (2013.01); *H04M 3/5141* (2013.01); *H04M 3/42382* (2013.01); *H04M 2203/406* (2013.01); *H04M 2203/556* (2013.01)

(58) Field of Classification Search
CPC .................................. H04M 3/51; H04W 4/14
USPC ...... 379/265.01–265.14, 266.01–266.1, 309, 379/201.01–201.12; 709/206
See application file for complete search history.

(56) References Cited

U.S. PATENT DOCUMENTS

| | | | |
|---|---|---|---|
| 6,415,250 B1 * | 7/2002 | van den Akker | G06F 17/2715 704/9 |
| 6,449,483 B1 | 9/2002 | Akhteruzzaman et al. | |
| 6,591,103 B1 | 7/2003 | Dunn et al. | |
| 6,690,932 B1 | 2/2004 | Barrier et al. | |
| 6,757,365 B1 | 6/2004 | Bogard | |
| 7,010,312 B1 | 3/2006 | Zechlin | |
| 7,197,035 B2 | 3/2007 | Asano | |
| 7,263,076 B1 | 8/2007 | Leibovitz et al. | |
| 7,275,104 B1 | 9/2007 | Martinez et al. | |
| 7,343,168 B2 | 3/2008 | Valloppillil | |
| 7,380,022 B2 | 5/2008 | Tell et al. | |
| 7,437,146 B2 * | 10/2008 | Dudley | H04L 51/30 455/412.2 |
| 7,446,655 B2 | 11/2008 | Jha et al. | |
| 7,499,704 B1 | 3/2009 | Bonner | |

(Continued)

FOREIGN PATENT DOCUMENTS

| | | |
|---|---|---|
| GB | 2397730 B | 6/2006 |
| GB | 2431820 A | 5/2007 |
| WO | 2007015075 | 2/2007 |

OTHER PUBLICATIONS

Notification of Transmittal of the International Search Report and the Written Opinion of the International Searching Authority, PCT/US2016/029665, pp. 12, Aug. 11, 2016.

(Continued)

*Primary Examiner* — William Deane, Jr.
(74) *Attorney, Agent, or Firm* — Chapin IP Law, LLC

(57) ABSTRACT

A method and system enables converting Application-to-Person (A2P) messaging to Person-to-Person (P2P) messaging. Customer replies to short code A2P messages are diverted to alternate destinations in an enterprise. Enterprise destinations include call center operations and data enabled devices in various departments in an enterprise. Information collected from the reply messages can be used to determine the appropriate destination and can be used to analyze support and marketing statistics.

19 Claims, 7 Drawing Sheets

(56) References Cited

U.S. PATENT DOCUMENTS

| | | |
|---|---|---|
| 7,564,958 B1 | 7/2009 | Contractor |
| 7,606,568 B2 | 10/2009 | Gallagher et al. |
| 7,693,535 B2 | 4/2010 | Dunko |
| 7,734,908 B1 | 6/2010 | Kung et al. |
| 7,860,525 B2 | 12/2010 | Parkkinen et al. |
| 7,865,198 B2 | 1/2011 | Shin |
| 7,940,896 B2 | 5/2011 | Prozeniuk et al. |
| 8,463,304 B2 | 6/2013 | Lauer et al. |
| 8,520,833 B1 | 8/2013 | Pettay et al. |
| 8,989,713 B2 | 3/2015 | Doulton |
| 2003/0101244 A1 | 5/2003 | Lockridge et al. |
| 2004/0076144 A1 | 4/2004 | Ishodoshiro |
| 2004/0109452 A1 | 6/2004 | Takihiro et al. |
| 2004/0137923 A1 | 7/2004 | Lang |
| 2005/0148353 A1 | 7/2005 | Hicks et al. |
| 2005/0149335 A1 | 7/2005 | Mesbah et al. |
| 2005/0277407 A1 | 12/2005 | Ahn et al. |
| 2005/0288045 A1 | 12/2005 | Yang et al. |
| 2006/0040606 A1 | 2/2006 | Kangas |
| 2006/0123360 A1 | 6/2006 | Anwar et al. |
| 2006/0142012 A1 | 6/2006 | Kirchhoff et al. |
| 2006/0148495 A1 | 7/2006 | Wilson |
| 2006/0259473 A1 | 11/2006 | Li et al. |
| 2007/0026901 A1 | 2/2007 | McKay |
| 2007/0032225 A1 | 2/2007 | Konicek et al. |
| 2007/0066318 A1 | 3/2007 | Danzeisen et al. |
| 2007/0073585 A1 | 3/2007 | Apple et al. |
| 2007/0190978 A1 | 8/2007 | White et al. |
| 2008/0043969 A1 | 2/2008 | Shi |
| 2008/0045250 A1* | 2/2008 | Hwang .................. H04W 4/14 455/466 |
| 2008/0114862 A1 | 5/2008 | Moghaddam |
| 2008/0140850 A1 | 6/2008 | Gade et al. |
| 2008/0172496 A1 | 7/2008 | Middleton et al. |
| 2008/0182563 A1 | 7/2008 | Wugofski et al. |
| 2008/0263137 A1 | 10/2008 | Pattison et al. |
| 2008/0270556 A1 | 10/2008 | Bamford |
| 2008/0293404 A1 | 11/2008 | Scherzer et al. |
| 2009/0005005 A1 | 1/2009 | Forstall et al. |
| 2009/0031232 A1 | 1/2009 | Brezina et al. |
| 2009/0154434 A1 | 6/2009 | Tanaka et al. |
| 2009/0156202 A1 | 6/2009 | Reiss et al. |
| 2009/0186634 A1 | 7/2009 | Sureka |
| 2009/0319914 A1 | 12/2009 | Roseway et al. |
| 2010/0029273 A1 | 2/2010 | Bennett |
| 2010/0035640 A1 | 2/2010 | Lew et al. |
| 2010/0124905 A1 | 5/2010 | Pratt et al. |
| 2011/0142211 A1* | 6/2011 | Maes .................. H04L 51/14 379/88.13 |
| 2012/0221962 A1 | 8/2012 | Lew et al. |
| 2012/0226759 A1 | 9/2012 | Lew et al. |
| 2013/0196697 A1 | 8/2013 | Lew et al. |
| 2013/0252649 A1* | 9/2013 | Siomina .................. H04W 4/02 455/466 |
| 2014/0106701 A1 | 4/2014 | Silver et al. |
| 2014/0179260 A1* | 6/2014 | Malin .................. H04W 4/22 455/404.2 |
| 2014/0269679 A1 | 9/2014 | Gillis et al. |
| 2015/0331956 A1* | 11/2015 | Hancock .................. H04W 4/02 707/758 |
| 2016/0191443 A1* | 6/2016 | Dudley .................. H04L 51/24 709/206 |
| 2016/0260025 A1* | 9/2016 | Goldberg .................. G06N 5/02 |
| 2017/0011018 A1* | 1/2017 | Hancock .................. H04W 4/02 |

OTHER PUBLICATIONS

European Search Report for corresponding European application No. 09805443.0, dated Dec. 11, 2013, total pp. 8.

International Search Report and Written Opinion dated Dec. 7, 2011 in corresponding International Application No. PCT/US2011/037190.

International Search Report for International Application No. PCT/US2009/052715 dated Sep. 24, 2009.

International Search Report and the Written Opinion for International Application No. PCT/US2016/029667, 3 pages, dated Aug. 5, 2016.

* cited by examiner

CALL CENTER A2P-TO-P2P MESSAGE ROUTING CONVERSION

CROSS REFERENCE TO RELATED APPLICATIONS

This application is related to U.S. patent application Ser. No. 13/803,331 entitled "MOBILE MESSAGE ENABLING ENTERPRISE OFFICE TELEPHONE NUMBERS," filed Mar. 14, 2013 and U.S. patent application Ser. No. 14/453,143 entitled "CALL CENTER MOBILE MESSAGING," filed Aug. 6, 2014. This application is also related to United States Patent Application entitled "CALL CENTER SMS-MMS LANGUAGE ROUTER," filed on an even date herewith. The entire teachings and contents of these Patent Applications are hereby incorporated by reference herein in their entireties.

FIELD OF THE INVENTION

The present invention relates to Application-to-Person (A2P) messaging, Person-to-Person (P2P) messaging, call center operations and enterprise communications with customer mobile devices.

BACKGROUND

SMS marketing campaigns referred to as application to person (A2P) utilize messages sent from an application to a subscriber. A2P is commonly used by financial institutions, airlines, hotel booking sites, social networks, and other organizations sending SMS from their systems to their customers. The A2P messages are frequently sent via a Short Code SMS text message and typically no response is expected or processed because of the conventional message flow and complications replying to a Short Code. A2P messages can also be sent via Long Codes in some regions. Long codes are standard ten-digit phone numbers enabled to send and receive SMS text messages but are not phone numbers (e.g., cannot be dialed/called, no voice, etc.). Conventional Person to Person (P2P) messaging includes messaging between two mobile subscribers. For technical and business reasons, the telecommunications industry including mobile network operators (MNOs) segregates A2P traffic (one-to-many) from P2P (one-to-one) message traffic, and this segregation sometimes includes message traffic operating over separate networks.

SUMMARY OF THE INVENTION

Embodiments disclosed herein extend the use of A2P Short Code mechanisms for outbound messaging by converting A2P communications to P2P, enabling enterprises to have one-to-one discussions with their customers.

Conversion of enterprise messaging (A2P to P2P) is achieved in accordance with one embodiment by a method including: registering at least one enterprise origin identity in a messaging hub and provisioning at least one alternate destination device by registering the at least one alternate destination device in the messaging hub and associating the at least one alternate destination device with the at least one enterprise origin identity. The enterprise origin identity can be a Short Code, a Long Code, a telephone number and a string of alphanumeric characters used as an origin of a message. The method further includes establishing a connection between the messaging hub and a message interface, receiving a reply message directed to the enterprise origin identity, determining an alternate destination for the reply message and diverting the reply message to the at least one alternate destination device. The message interface can be an SMS interface including at least one of an SMS/MMS Gateway, an IP messaging Gateway or a short message service center/multimedia message service center (SMSC/MMSC). The reply message can be a reply to an A2P message. The alternate destination device can be a call center interface which can be an enterprise customer relationship management system of a call center. Such a method solves a problem that has not been solved yet in a manner that allows an enterprise to employ A2P messaging to reach a large number of customers while providing a means to follow up with P2P messaging to further support its customers.

In one embodiment, registering the at least one alternate destination device includes determining the type of alternate destination device and storing addressing information for the alternate destination device. In still another embodiment, determining an alternate destination for the reply message includes scanning the reply message, extracting key words from the reply message and determining the alternate destination based on the extracted key words.

In yet another embodiment, determining an alternate destination for the reply message includes scanning the reply message, determining one of: a geographical origin of the reply message, a carrier origin parameter of the reply message and determining a time parameter of the reply message and further determining the alternate destination based on one of: the geographical origin of the reply message, the carrier origin parameter of the reply message and the time parameter of the reply message. In another embodiment, the method further includes storing an association between the telephone number of the origin of the diverted reply message and the alternate destination, and further includes using the stored association for diverting additional messages received from the origin of the diverted reply message thereby converting an A2P conversation to a P2P conversation.

In a further embodiment, the technique includes scanning the reply message, determining a source including telephone number of the reply message, accessing additional information about the source and determining an alternate destination based on the additional information. Determining an alternate destination based on the additional information includes deleting the reply message. In another embodiment, the technique further includes filtering the reply message with a filter, the filter can be a spam filter or a language filter.

A messaging hub for converting an enterprise messaging conversation includes a server connected to a message interface (e.g., an SMS interface), a database running on the server for registering at least one data enabled device, an incoming message queue for storing a reply message and a diverter for directing the reply message to the at least one data enabled device as an alternate destination for the reply message. The messaging hub further includes a reply message scanner coupled to the incoming message queue. Such a device allows converting an A2P SMS message thread from a broadcast (one-to-many) to a one-to-one discussion P2P message thread automatically without any human intervention, knowledge or effort by any participant involved in the original message thread.

It is to be understood that the features of the messaging hub and call center can be embodied strictly as a software program, as software and hardware, or as hardware alone such as within a single processor or multiple processors, or within an operating system or within a software application.

Other embodiments of the invention that are disclosed herein include software programs to perform the steps and operations summarized above and disclosed in detail below. One such embodiment comprises a computer program product that has a non-transitory computer readable medium including computer program logic encoded thereon that, when performed in a computerized device having a coupling of a memory and a processor and a display, programs the processor to perform the operations disclosed herein. Such arrangements are typically provided as software, code and/ or other data (e.g., data structures) arranged or encoded on a computer readable medium such as an optical medium (e.g., CD-ROM), hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein

DETAILED DESCRIPTION

In an exemplary embodiment, a service utilizes A2P Short Codes to send multiple SMS messages (one-to-many) to multiple recipients (e.g., customers). Replies by one or more of the recipients can be diverted/redirected to an alternate destination that is enabled to more efficiently handle a continued discussion instead of just deleting or ignoring the reply. The alternate destination can be an enterprise's (sender)'s call center for handling the reply or possibly an enterprise department which is suited to handle the reply. Further communication from the enterprise can be P2P messaging from the call center, alternate destination messaging enabled enterprise devices or messaging from enterprise employees' mobile phones.

In one embodiment, such features are facilitated by a messaging hub which manages both the Short Code A2P traffic and the P2P DID (e.g., 800 numbers) traffic of the enterprise. In certain embodiments the messaging hub facilitates SMS communications between consumers and call centers and other departments within an enterprise. A customer replying to a Short Code A2P broadcast message, just needs to have basic SMS functionality on a mobile device (available in most every recently manufactured cell phone). Alternatively the customer can use an IP based text messaging service, for example, HeyWire provided by HeyWire Inc. In some embodiments IP based text messaging service provides additional features when contacting a call center (e.g., automatically supplying additional information about a device or location information).

Figure 1:
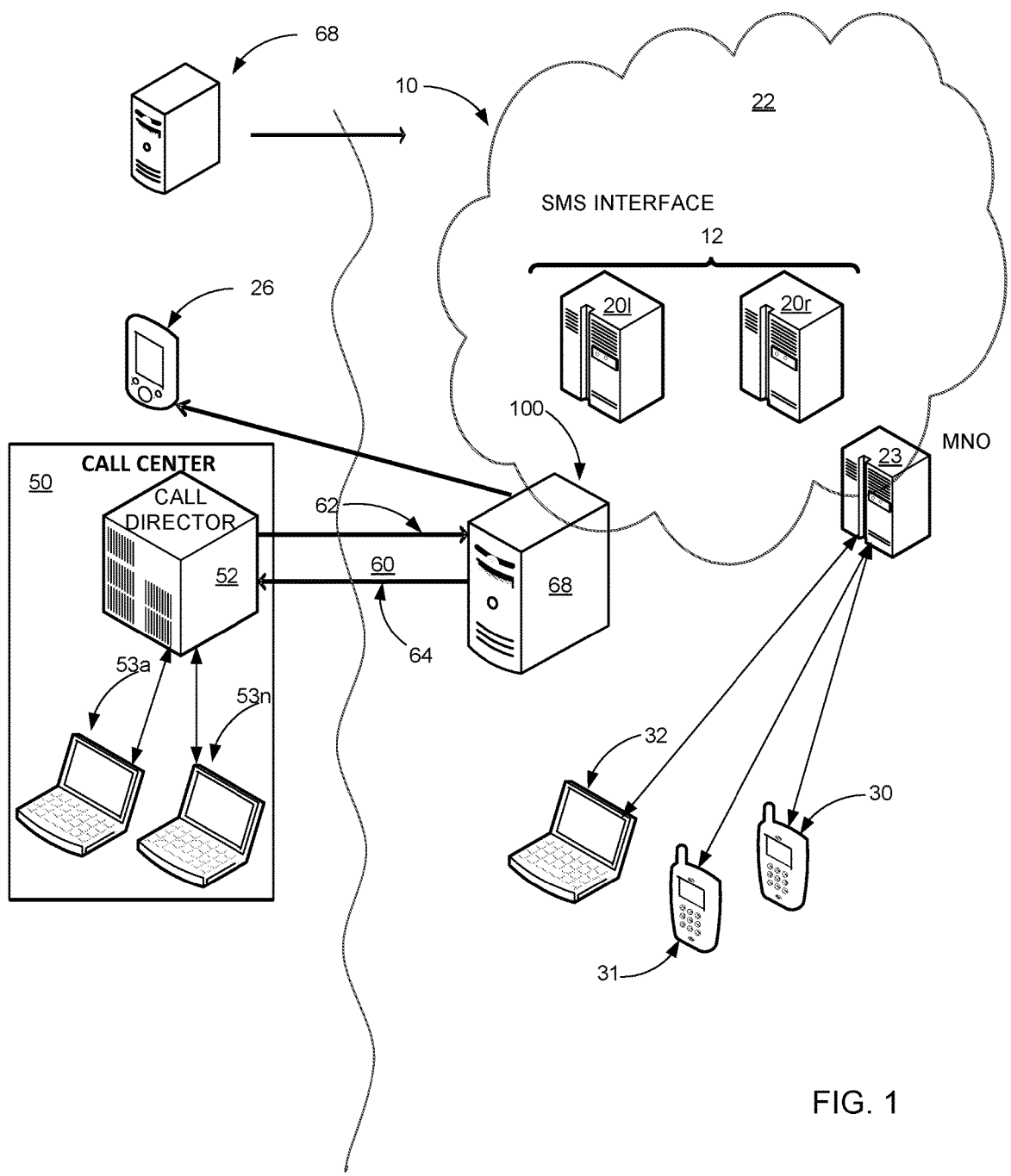
FIG. 1 is a schematic illustration of a messaging hub, a call center, an A2P application, operating in a mobile network environment/messaging infrastructure to communicate with customers in accordance with embodiments disclosed herein.

Now referring to FIG. 1, an exemplary messaging hub 100 operates in network environment 10 and relays messages between employee alternate destination devices 26 (also referred to as an employee device 26, or a data enabled device 26), a server 68 with application programs to provide A2P messages, a call center 50 and customer devices 30. Other employee devices include, for example, a mobile phone 30, a smartphone 31 a laptop 32 and other data enabled devices (not shown) such as a netbook and a tablet. Customer devices include, for example, a mobile phone 30, a smartphone 31 a laptop 32 and other data enabled devices (not shown) such as a netbook and a tablet.

The messaging hub 100 can communicate with customer devices 30 through a mobile network operator (MNO) 23 via an SMS interface 20l (local to messaging hub 100) and 20r (remote from messaging hub 100). The SMS interface can include interconnected systems such as short message service center/multimedia message service center (SMSC/MMSC) both local and remote, SMS/MMS Gateways and IP messaging Gateways. The SMS interface 12 is a network element in the network environment 10. One of the SMS interface's 12 purposes is to store, forward, convert and deliver SMS/MMS messages to the MNO 23 and messaging hub 100. The link between the messaging hub 100 and the global messaging infrastructure 22 and the link between the messaging hub 100 and the call center 50 can be secured by the firewall 102 using a virtual private network (VPN) secure IP connection with HTTPS using 128-bit or higher encryption, for example, 1024 bit (3DES-SHA1) encryption.

It is noted that it is possible for an A2P server 68 and/or the employee device 26 to send messages without the message being processed by the messaging hub 100 because replies to the Short Code address will still be processed by the messaging hub 100. However, the messaging hub 100 will not be able to create and maintain a complete messaging thread for the entire conversation.

In operation, the messaging hub 100 in one embodiment provisions the server 68 which sends A2P messages to a list of recipients (e.g., customers) using, for example a Short Code. The messaging hub 100 in one embodiment provisions the call center 50 and the employee devices 26 as alternate destinations for reply messages addressed with the Short Code used in the A2P messages (i.e., messages which are not sent back to the message origination server 68). The messaging hub 100 also establishes a secure connection to the SMS interface 12 to send and receive SMS messages which are processed by MNO 23. The provisioning process is described in more detail below in conjunction with FIG. 4.

After provisioning, the messaging hub 100 receives a reply messages from the customer device 30 in response to the Short Code A2P message. After receiving the reply, the messaging hub 100 diverts the reply message to an alternate destination, for example, the call center 50, employee devices 26 or other registered alternate destination device.

The messaging hub 100 communicates with the call center 50, in one embodiment, over a secure connection 60 (e.g., a VPN connection). The call center 50 generally includes a call director 52 or alternatively other systems for dispatching customer call to CSRs. The call center generally includes multiple workstations 53a-53n for use by the CSRs (collectively referred to as CSR workstation 53). In one embodiment, the messaging hub 100 and call center 50 communicate data, number provisioning information, messages and message thread information over the secure connection 60.

Figure 2:
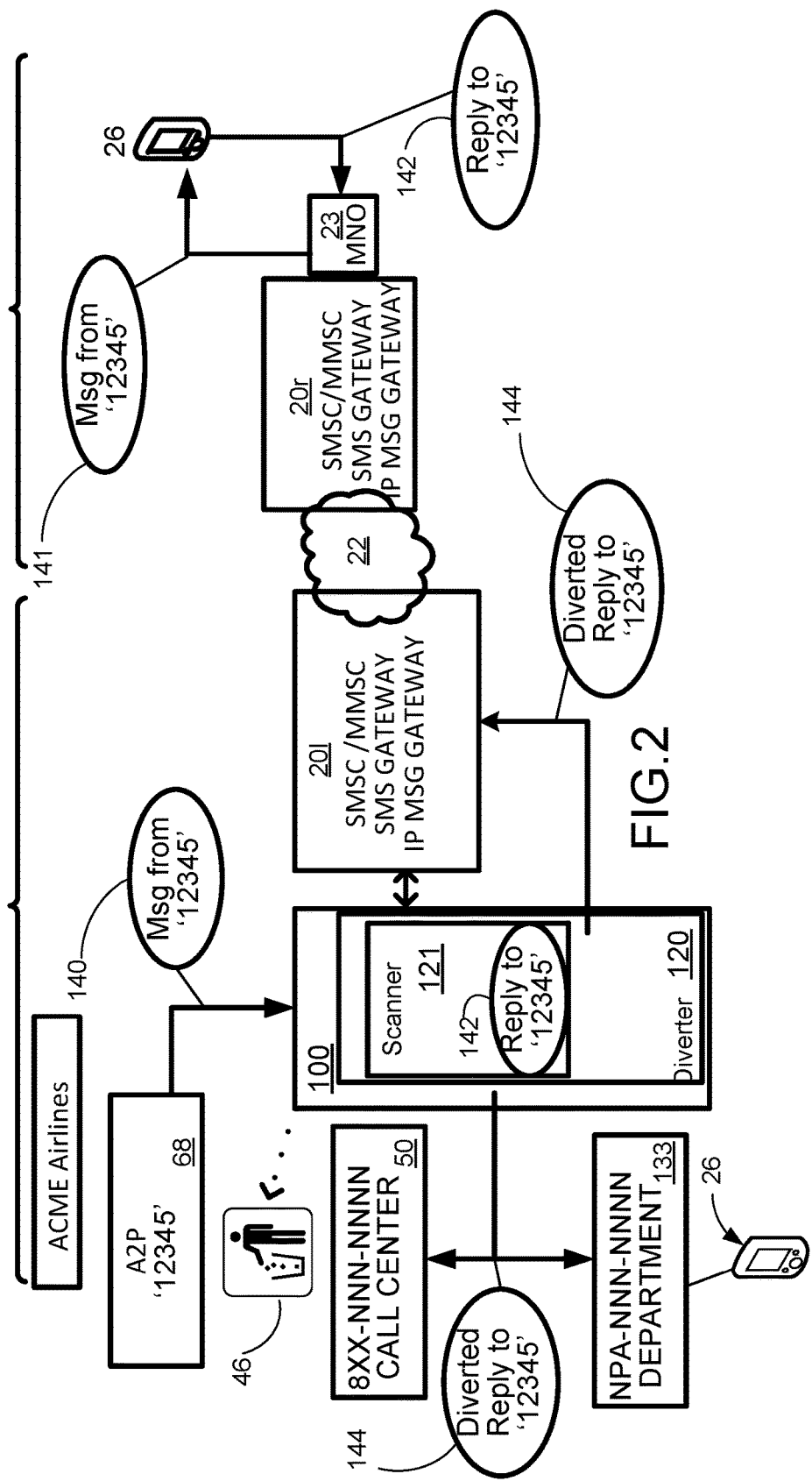
FIG. 2 illustrates details of an embodiment of the messaging hub of FIG. 1 including details of diverting a reply to an A2P message, the reply sent from a customer.

Now referring to FIG. 2, the exemplary messaging hub 100 operates in the network environment 10 which includes global messaging infrastructure 22 with local SMS gateway 20l and remote SMS gateway 20r. The messaging hub 100 further includes the diverter 120 which includes a scanner 121. FIG. 2 illustrates the diversion of a reply to an A2P message 140 sent by an enterprise "ACME Airlines." In one embodiment, the enterprise application server 68 runs an application which can generate Short Code messages to be sent to multiple recipients (e.g., customers, subscribers etc.). The application sends an SMS message 140 with Short Code 12345. For example, an airline after determining a flight delay might send a message to all ticketed passengers as follows:

ACME Airlines: Your flight, F125, is delayed. Please reply if you have questions."

The message 140 is processed by the messaging hub 100 and sent through the local SMS interface 20l, network 10, remote SMS interface 20r and mobile network operator (MNO) 23 and finally to the customer device. It is understood that functionality of components in the local SMS interface 20l and remote SMS interface 20r and network 10 can be combined in various ways.

Here, the passenger can respond to the message without having being directed to a different DID or other address (email, etc.) or having to lookup another SMS destination in order to text, discuss, rebook with a real person the issue. The customer can send a reply message 142 back through the MNO 23 and SMS gateway 20r. The reply message 142 is initially delivered to the messaging hub 100. Instead of deleting the reply message 142 as indicated by trash can 46 or not delivering the message to server 68, the reply message 142 is processed by the diverter 120 and the scanner 121 and is sent as a diverted reply message 144 to one of several alternate destinations including the call center 50, a department 133 associated with registered alternate destination device 26 or another registered alternate destination device 26 reached through the SMS interface 20. Thus the messaging hub 100 provides the ability to have two-way, one-to-one communication instead of forcing a customer to reply to the Short Code of a machine generated message. In contrast, a reply to the Short Code would typically be deleted or never reach the originating server 68.

The scanner 121 scans the reply message 142 to provide additional information to decide which alternative destination should be used for diverting the reply message 142. For example, the scanner 121 scans the reply message 142 to determine a geographical origin of the reply message, a carrier origin parameter of the reply message 142 or a time parameter of the reply message. The diverter can then select the alternate destination based on one or more of these parameters. For example, based on an origin direct inward dial number (DID) (e.g., "617" a Boston area code) the reply message 142 could be diverted to a call center 50 in the same ET time zone or if it is the middle of night, the reply message 142 could be diverted to a different call center in a different time zone which is staffed at that time to ensure a response.

The scanner 121 can also scan a message body for keywords (e.g., 'billing', 'payment', 'coupon', 'promotion', etc.) to enable diversion of the reply message 142 to a different Enterprise location which is enterprise department (e.g., Billing Dept., the Marketing Dept., etc.) or a specialized call center. In this case the reply message 142 would be diverted to device registered to receive reply messages associated with Short Code '12345'. The reply messages can be diverted to a telephone number, a Customer Relationship Management (CRM) system, a non-telephone related messaging system or a call center, etc. The CRM, non-telephone related messaging system and call center can be integrated into the CRM and connected to the messaging hub 100.

When the messaging hub 100 determines that the diverted reply message 144 is intended for a particular call center, the messaging hub 100 communicates with the call center 50 through corresponding applications and the diverted reply message 144 is delivered to the call center 50 as described below in further detail.

The call director 52 can direct the diverted reply message 144 to the appropriate CSR, and has the ability in conjunction with the messaging hub 100 to maintain the integrity of a customer query. In one embodiment, a graphical user interface running on the CSR workstation 53 allows the CSR to receive and compose SMS messages and to view or listen to multimedia attachments.

Figure 3:
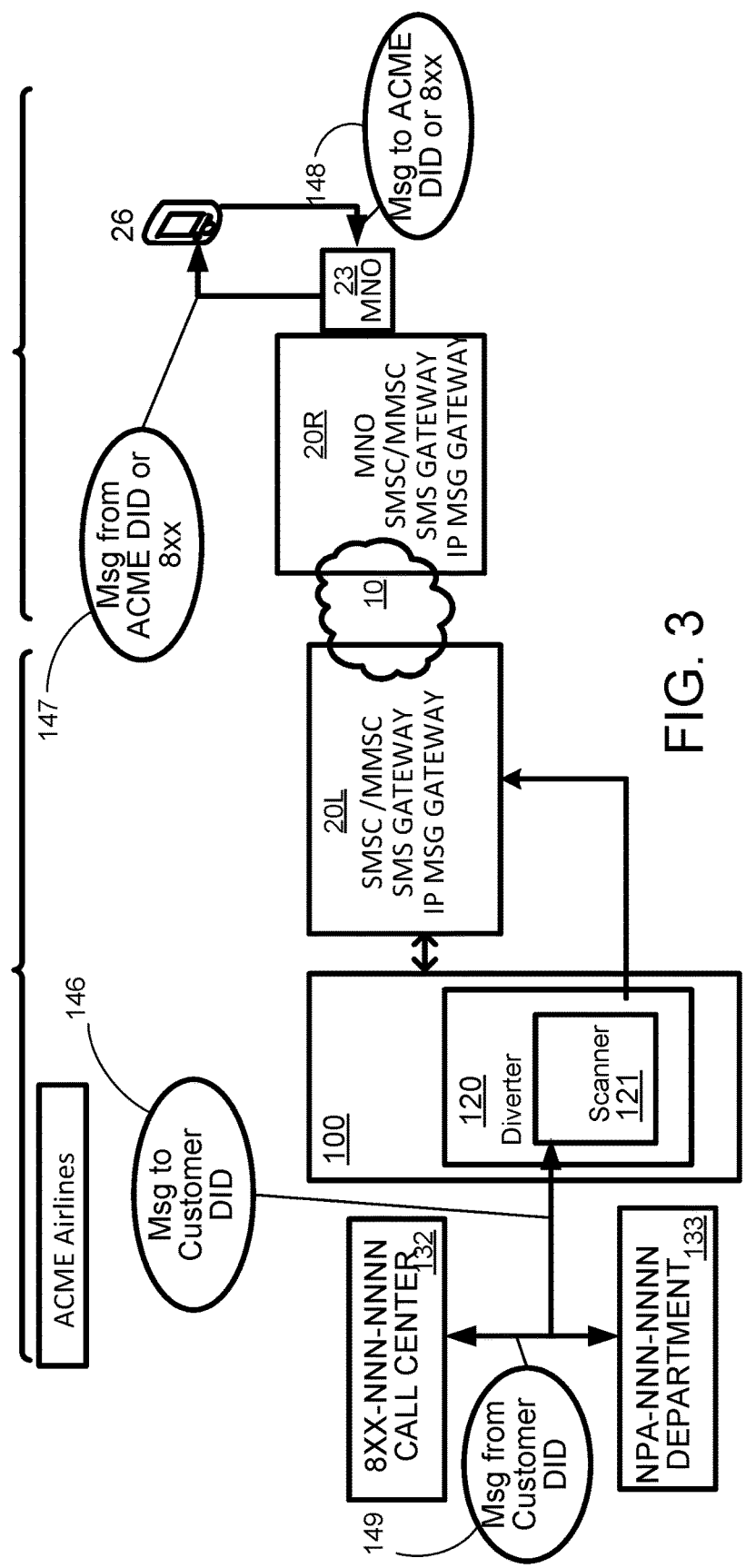
FIG. 3 illustrates details of an embodiment of the messaging hub of FIG. 1 including details of a follow on P2P conversation after a diverting a reply to an A2P message is from a customer.

Now referring to FIG. 3, the exemplary messaging hub 100 can facilitate converting an A2P message into a P2P conversation. After receiving a diverted reply 142, an alternate destination responds with a message 146 to the customer using the customer's DID number. In the example from above, message 146 has an origin of an ACME 8xx or DID number and a destination of the customer DID. The customer receives the message 147 from the alternate destination device which now includes the enterprise's 8xx (800 number) or the DID of the alternate destination device which received the diverted reply message 144 and was selected to continue the P2P conversation.

To continue the P2P conversation, the customer can reply with follow-on message 148 having an origin of the customer DID and a destination of ACME 8xx-xxx-xxxx or ACME NPA-nnn-nnnn. The choice of 8xx format or NPA format is determined by the telephone number allocation of the enterprise. After the customer receives the DID or 8xx of the enterprise, the messaging hub functions as a normal messaging hub by routing messages (both directions) to appropriate persons/destinations and maintaining the conversation thread. It is also understood, that further redirection of a customer message is possible during a P2P conversation.

In one embodiment, the scanner 121 is implemented as a 'rules processor.' It is supplied with relevant key words and phrases of interest which might be included in the SMS/MMS messages transmitted to and received from customers, and if there's a match, process an action which possibly leads to an alternative destination determination. In a specific embodiment the scanner 121 is implemented as a dynamic IF-THEN-ELSE machine which can re-route a message, dump/trash a message or change priority of a message.

Figure 4:
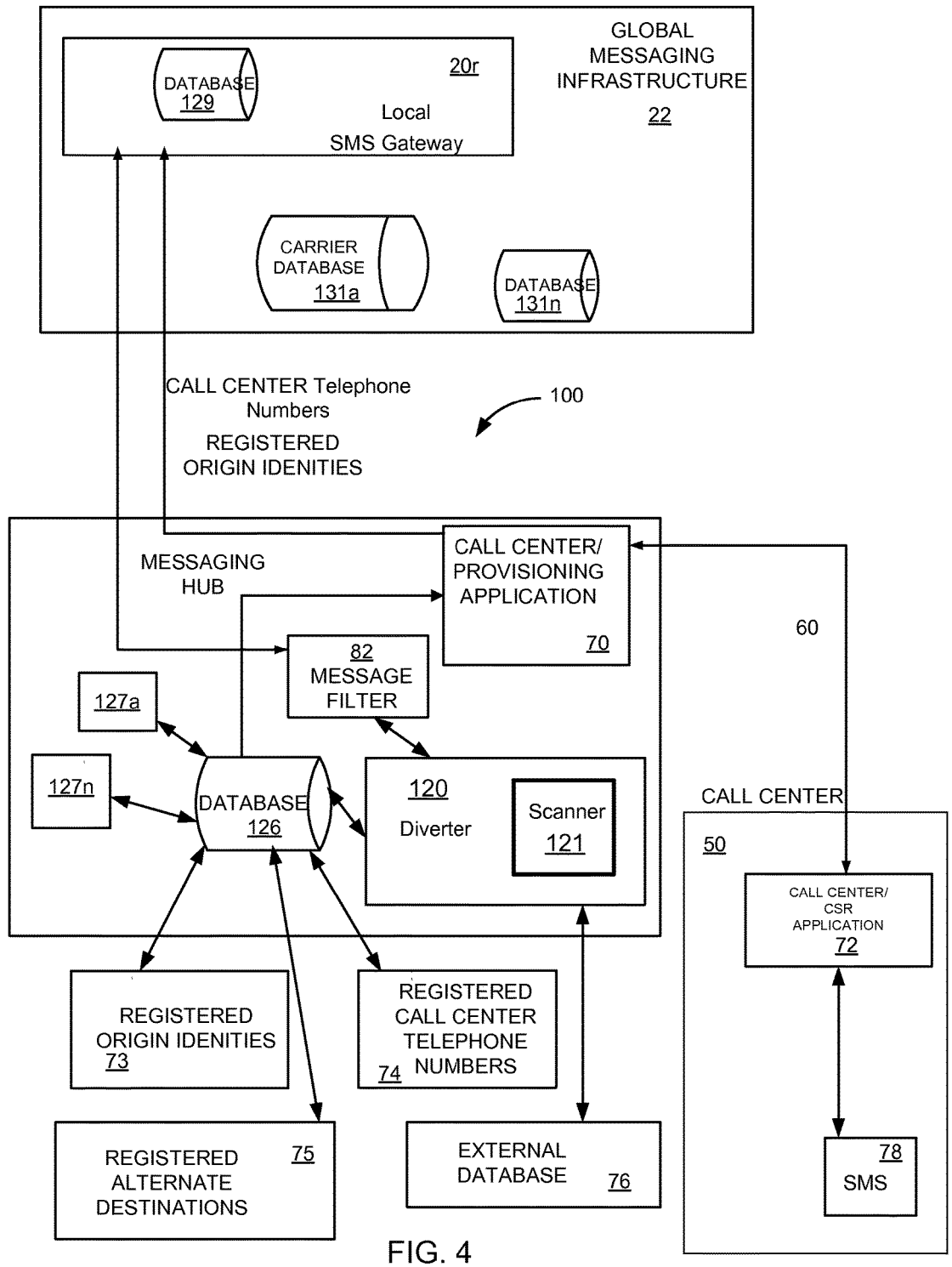
FIG. 4 illustrates further details of an embodiment of the messaging hub of FIG. 1.

FIG. 4 illustrates further details of the provisioning process and communication between the messaging hub 100 and the call center 50 and other alternate destination devices. The messaging hub 100 further includes a Hub call center application 70 which communicates with a corresponding call center/CSR application 72 in the call center 50 over the secure connection 60. The messaging hub 100 further includes a database 126 which is interfaced to the diverter 120 and stores registered origin identities 73 (e.g., Short Codes and related application and server information), registered call center telephone numbers 74, registered alternate destinations 75 (e.g., 8xx and DID telephone numbers) and associations between registered origin identities 73 and registered alternate destinations 75.

In one embodiment, Information and associations with key words and other parameters regarding the registered alternate destinations 75 are preloaded into the messaging hub 100 from the CRM system as part of CRM function. In an alternate embodiment, the messaging hub queries the CRM for the appropriate alternate destination based on criteria provided by the diverter 120 and scanner 121.

The scanner 121 can also access an external database 76 to obtain additional information used for the alternate destination determination. In one embodiment, the external database 76 belongs to the enterprise and includes customer information associated with the customer DID telephone number which is obtained form the reply message 142 or the follow-on message 148.

During operational setup, a call center telephone number (or a block of numbers), origin identities, and numbers for some alternate destination devices are transferred to the messaging hub 100 and registered in the database 126. The call center telephone numbers, origin identities, and numbers for some alternate destination devices are pushed or published into the database of the various directories, for example a carrier database 129 of the local SMS gateway 20 and/or industry databases 131a-131n of other SMS interfaces in the global messaging infrastructure 22. This allows replies to origin identities (e.g., Short Codes) to be delivered to the messaging hub 100 for final delivery.

Alternate destination device numbers which are not carrier provisioned are not typically registered with any of the industry directories, operators or SMS/MMS aggregators within the mobile ecosystem. When SMS/MMS messages are processed by a mobile operator or SMS/MMS aggregator, the aggregator or operator needs to find a registered number in the various directories to determine if the number is a legitimate and active number and where to route the SMS/MMS message. All phone numbers are associated with an "owner of record" in the various databases in the mobile ecosystem and the appropriate routing destination is determined by "who" the owner of record is for the particular number in question. The Messaging hub 100 enables recognition and routing capabilities by provisioning alternate destination device numbers into the various databases in the mobile ecosystem. When an entity such as any mobile operator or SMS/MMS aggregator receives a message for routing, upon query to one or more of the industry's databases, it determines who is the owner of record for the message based on the destination phone number of the SMS/MMS message.

After provisioning, when the destination phone number of the SMS/MMS reply message 142 is a Short Code, the reply message 142 will be routed to the messaging hub 100. For example in one embodiment, the reply message 142 with a destination phone number/Short Code of '12345' that was provisioned by Messaging hub 100 into the various databases, is identified as Messaging hub 100 as the "owner of record," and thus routed to Messaging hub servers and network for handling. Upon receipt by Messaging hub 100 in conjunction with the diverter 120, and servers 127a-127n which maintains stat and session information and using records in the database 126 can determine the alternate destination for the message and can either locate the deliver the message to the active call center 50 or the alternate destination device The industry directories, operator directories or SMS/MMS aggregators directories including databases are situated in a local, regional, national or international network. There are copies of a government master directories and subsets of the master government directories which are used and provided by the government.

Provisioning of the origin identities, call center telephone numbers (obtained from the call center 50 through call center application 72 (which receives an SMS message 78) or other means, and messaging hub call center application 70 in the messaging hub 100) and alternated destination devices into all the assorted databases, public and private, in the global messaging infrastructure 22 requires recognition and allowance by the mobile operators for mobile messages from non-mobile operator sources to flow through the network. This recognition and allowance is provided in advance of provisioning of call center telephone numbers. As a result of provisioning by the messaging hub 100, the call center telephone numbers reside and are registered in databases that are queried by the SMSC/MMSCs and other mobile industry elements.

Figure 5:
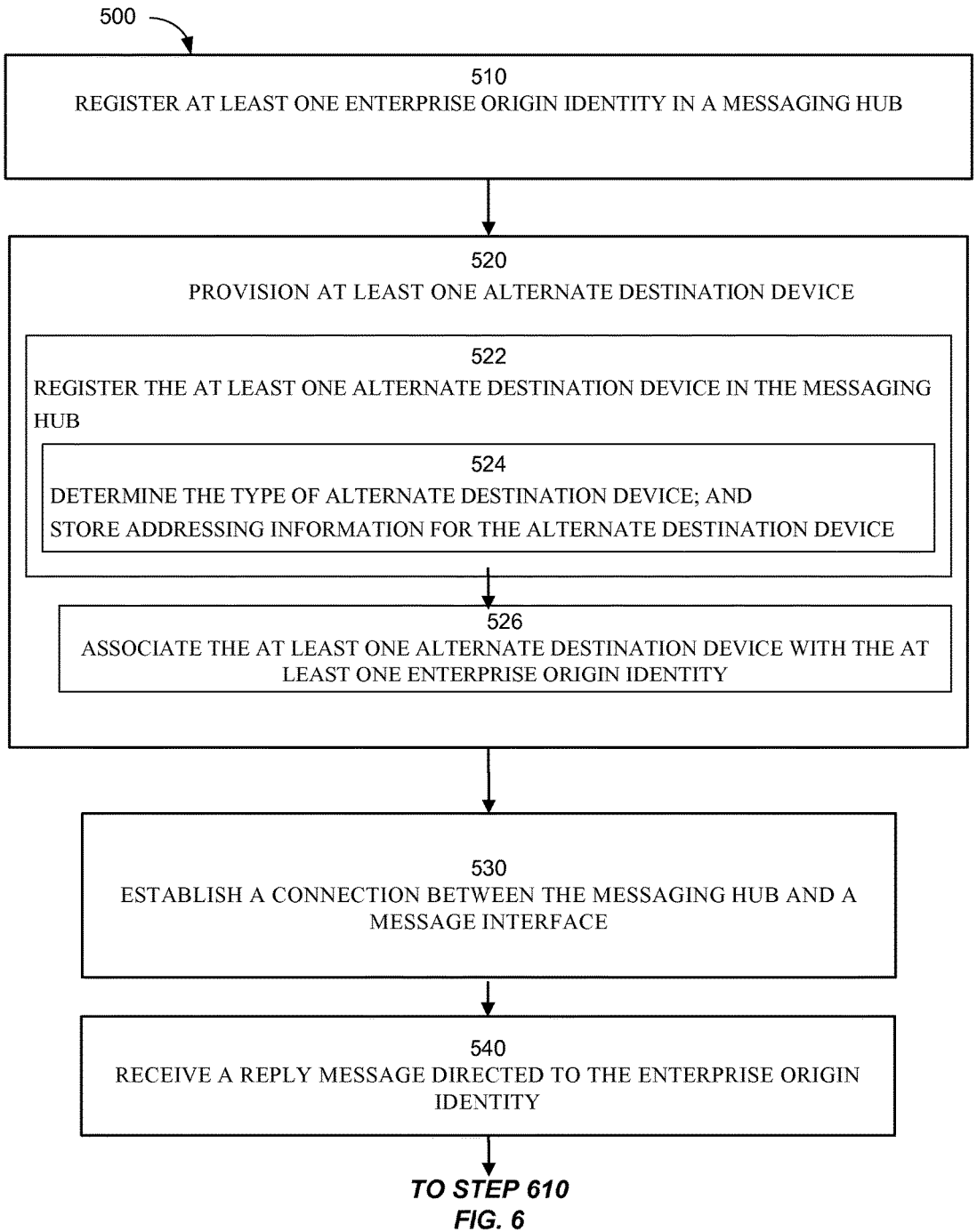
FIGS. 5-7 are flow charts of processing steps performed for provisioning call center telephone numbers and operation of the messaging hub in conjunction with the call center of FIG. 1.

In FIG. 5, flowchart 500 diagrams the overall process of converting an enterprise A2P messaging to a P2P messaging conversation. In step 510, at least one enterprise origin identity is registered in a messaging hub. In one embodiment, a Short Code, a telephone number and a string of alphanumeric characters are associated with an enterprise origin identity which is preloaded into the messaging hub 100 database 126 from the CRM system as part of CRM function. The enterprise origin identity includes but is not limited to, a Short Code, a Long Code, a telephone number and a string of alphanumeric characters used as an origin of a message. In step 520, at least one alternate destination device is provisioned. The provisioning step 520 includes step 522, registering the at least one alternate destination device in the messaging hub and step 524, determining the type of alternate destination device and storing addressing information for the alternate destination device. The provisioning step 520 further includes step 526 associating it with the at least one enterprise origin identity. When the alternate destination is a call center the call center telephone number(s) are provisioned for SMS communication. In one embodiment, the provisioning process includes provisioning the call center number including routing information into a carrier database directory.

In step 530, a secure connection is established between the messaging hub and the call center interface. In one embodiment, the alternate destination device is a call center interface which can connect to multiple devices for text messaging. In step 540, a reply message directed to the enterprise origin identity is received.

Figure 6:
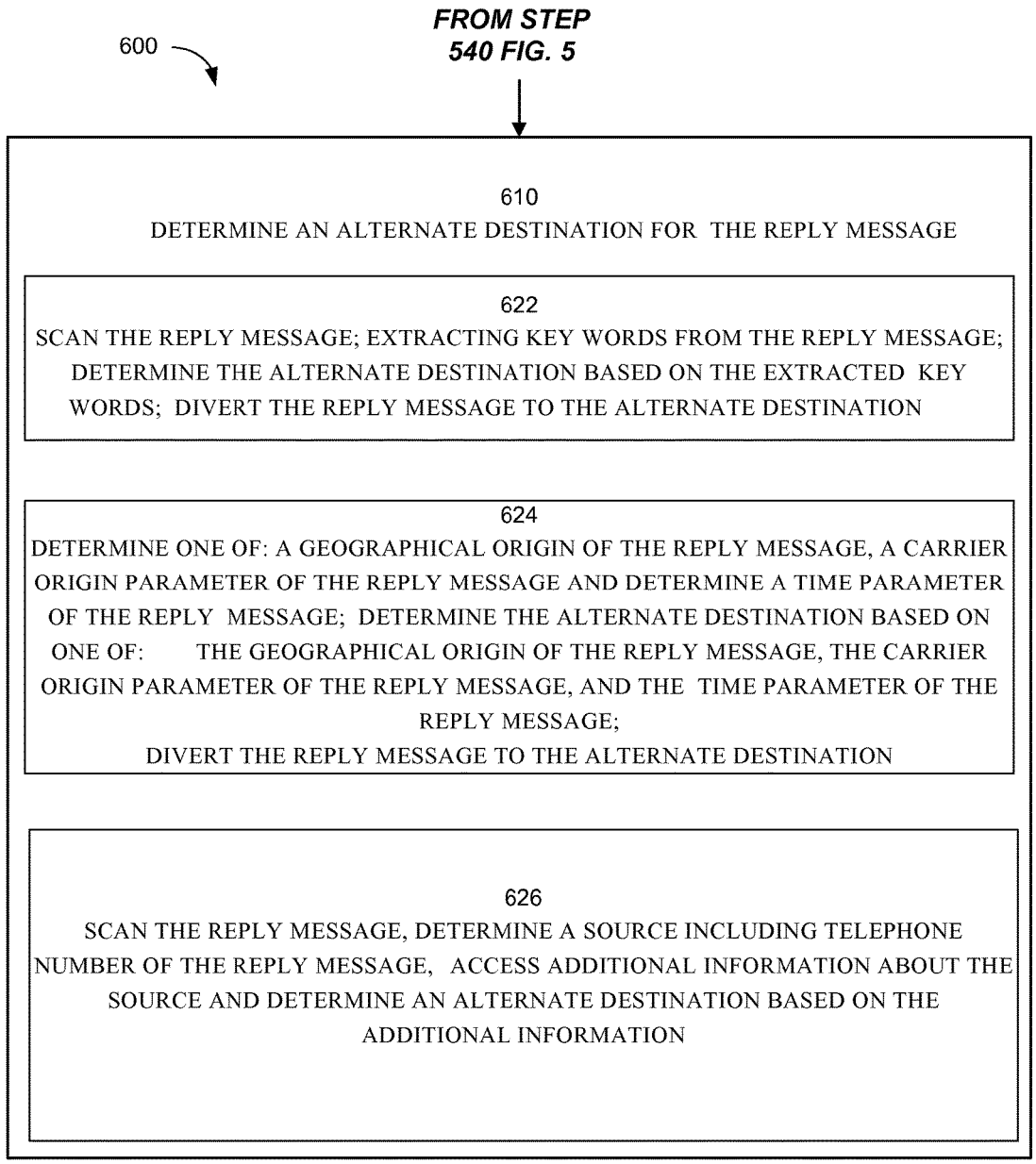

Now referring to In FIG. 6, flowchart 600 diagrams further details of determining an alternate destination for the reply message. In step 610, an alternate destination for the reply message 142 is determined including in step 622 scanning the reply message, extracting key words from the reply message; and determining the alternate destination based on the extracted key words. For example, extracted key words such as 'complain,' 'buy,' 'return,' 'order' and 'change' are used to select a department or specific call center representative as the alternate destination or a new destination during a P2P conversation.

Another technique for determining the alternate destination for the reply message in step 624 includes scanning the reply message, determining a geographical origin of the reply message, a carrier origin parameter of the reply message 142 or determining a time parameter of the reply message 142. Step 624 further includes determining the alternate destination based the geographical origin of the reply message 142, the carrier origin parameter of the reply message 142 and the time parameter of the reply message 142.

Another technique for determining the alternate destination for the reply message in step 626 includes scanning the reply message, determining a source including telephone number of the reply message 142, accessing additional information about the source and determining an alternate destination based on the additional information.

In a further embodiment, the technique includes scanning the reply message 142, determining a source including telephone number of the reply message 142, accessing additional information about the source and determining an alternate destination based on the additional information. In one embodiment, determining an alternate destination based on the additional information comprises deleting the reply message. For example an airline could send an automated A2P message broadcast to customers announcing a flight delay. The customers could reply to the A2P message. The diverter 120 can access the external database 76 and make a determination based on the telephone number of the customer to either delete the reply message or divert the reply message 142 to the call center 50 or to another department base on information in the external database (e.g., frequent flier status).

Figure 7:
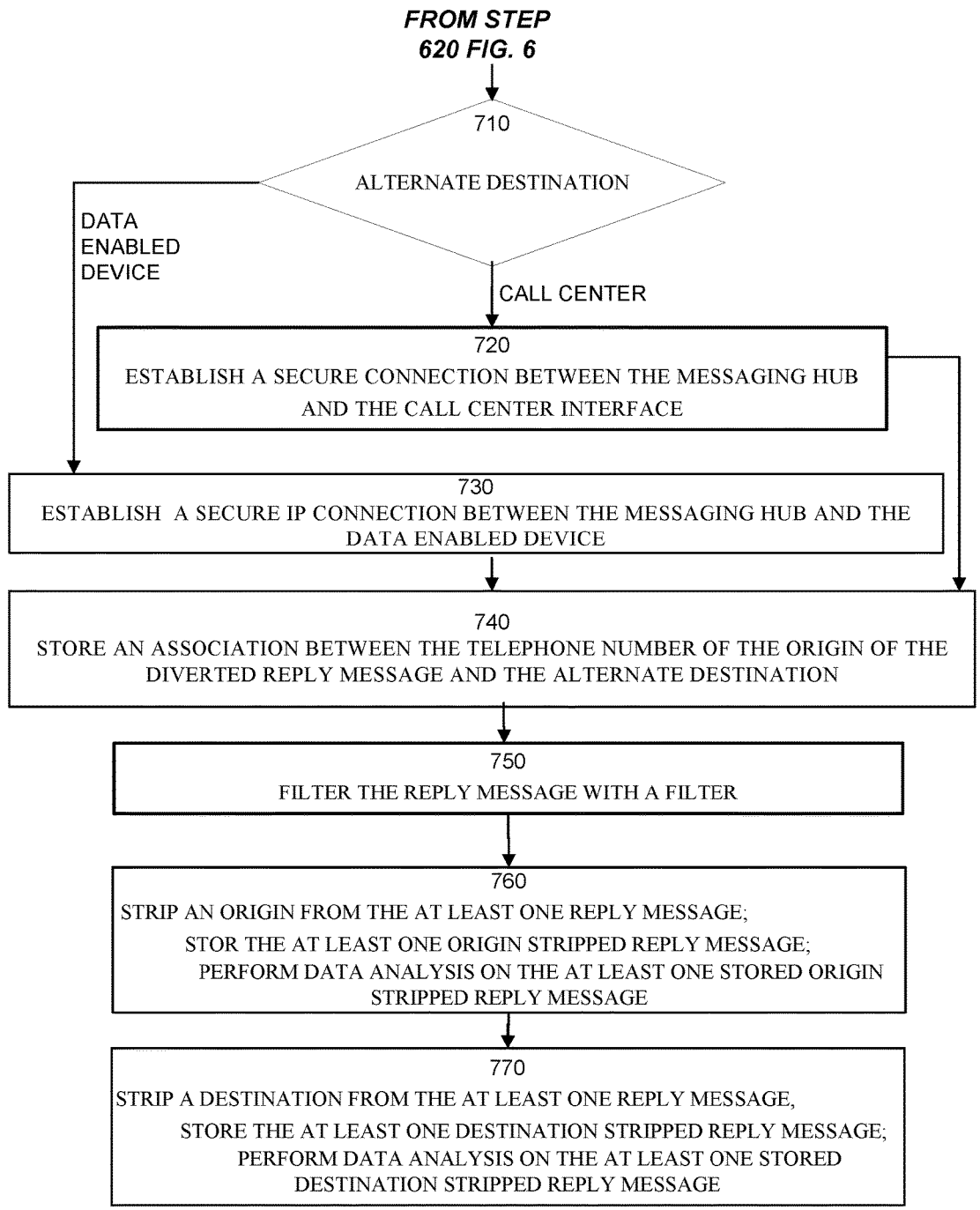

Now referring to In FIG. 7, flowchart 700 diagrams further details of determining an alternate destination for the reply message. In step 710, it is determined whether the alternate destination is a call center or a data enabled device. The reply message 142 is generally addressed to the Short Code in the reply, and thus the Messaging Hub determines which Enterprise owns that specific Short Code, and diverts the reply message to an 8xx/NPA call center DID associated with that enterprise. In one embodiment, it is possible to set a temporary default diversion to either a call center or a data enabled device, for example if the call center went offline.

If the alternate destination is a call center 50, a secure connection is established between the messaging hub 100 and the call center interface in step 720 and processing continues in step 740. In one embodiment, the call center interface can be an enterprise customer relationship management system of a call center. If the alternate destination is a data enabled device 26, a secure connection is established between the messaging hub 100 and the data enabled device 26 in step 730 and processing continues in step 740.

In step 740, an association between the telephone number of the origin of the diverted reply message and the alternate destination can be optionally stored. This allows the alternate destination to be reused to support further P2P conversations originating from a source (e.g., customer) whereby additional messages from the source can be diverted to a call center destination or a company department based on previous communications.

In one embodiment, in step 750, the reply message 142 can be filtered with a filter. The filter includes in one embodiment a spam filter and in another embodiment a language filter. The filter can be used to prevent spam replies. Using the language filter facilitate diverting the reply to an alternate destination. For example, if the filter detects Spanish, the reply can be diverted to a call center with Spanish language capabilities.

In another embodiment, in step 760, an origin is stripped from the at least one reply message, the origin stripped reply message is stored and data analysis is performed on the stored origin stripped reply message. In another embodiment, in step 760, a destination is stripped from the at least one reply message 142, the origin stripped reply message is stored and data analysis is performed on the stored destination stripped reply message.

Although the example and embodiments are described above with respect to SMS/MMS messaging, the present invention is not limited to SMS/MMS messaging. The methods disclosed herein can apply to other messaging environments as well as mixture of SMS/MMS with other messaging environments. For example an enterprise, ACME Airlines, sends messages via A2P, and responses when received are diverted/redirected to a proprietary messaging platform such as the enterprise's own messaging platform, or even another commercial platform such as Facebook Messenger, etc. Ongoing conversation threads can use a mixture of messaging environments. Alternatively, an entire conversation could include no SMS messaging. For example the conversation could occur entirely using Facebook Messenger, and switch between Facebook Messenger and more granular apps within Facebook Messenger.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A computer-implemented method for converting enterprise messaging, the method comprising:
   registering at least one enterprise origin identity in a messaging hub;
   provisioning at least one alternate destination device comprising:
      registering the at least one alternate destination device in the messaging hub; and
      associating the at least one alternate destination device with the at least one enterprise origin identity;
   establishing a connection between the messaging hub and a message interface;
   sending an application to person (A2P) message;
   receiving a reply message to the sent A2P message, directed to the enterprise origin identity;
   determining an alternate destination for the reply message;
   diverting the reply message to the at least one alternate destination device;
   wherein the reply message is one of:
      an SMS message; and
      an MMS message;
   wherein the message interface is an SMS interface including at least one of:
      an SMS/MMS Gateway;
      an IP messaging Gateway; and
      an SMSC/MMSC; and storing an association between a telephone number of the origin of the diverted reply message and the alternate destination.

2. The method of claim 1, wherein registering the at least one alternate destination device comprises:
    determining a type of alternate destination device; and
    storing addressing information for the alternate destination device.

3. The method of claim 1, wherein the enterprise origin identity comprises one of:
    a Short Code;
    a Long Code;
    a telephone number; and
    a string of alphanumeric characters used as an origin of a message.

4. The method of claim 1, wherein the at least one alternate destination device is a call center interface and further comprising establishing a secure connection between the messaging hub and the call center interface.

5. The method of claim 4, wherein diverting the reply message comprises diverting the reply message to the call center interface.

6. The method of claim 4, wherein the call center interface is an enterprise customer relationship management system of a call center.

7. The method of claim 1, wherein the at least one alternate destination device is a data enabled device and further comprising establishing a secure IP connection between the messaging hub and the data enabled device.

8. The method of claim 1, wherein determining an alternate destination for the reply message comprises:
    scanning the reply message;
    extracting key words from the reply message; and
    determining the alternate destination based on the extracted key words.

9. The method of claim 1, wherein determining an alternate destination for the reply message comprises:
    scanning the reply message;
    determining one of:
        a geographical origin of the reply message;
        a carrier origin parameter of the reply message; and
        determining a time parameter of the reply message; and
    determining the alternate destination based on one of:
        the geographical origin of the reply message;
        the carrier origin parameter of the reply message; and
        the time parameter of the reply message.

10. The method of claim 1 further comprising using the stored association for diverting additional messages received from the origin of the diverted reply message thereby converting an A2P conversation to a person to person (P2P) conversation in the message hub.

11. The method of claim 1, wherein the reply to the A2P message is a reply to an A2P message sent via one of
    a Short Code; and
    a Long Code.

12. The method of claim 1, wherein determining an alternate destination for the reply message comprises:
    scanning the reply message;
    determining a source including telephone number of the reply message;
    accessing additional information about the source; and
    determining an alternate destination based on the additional information.

13. The method of claim 12, wherein determining an alternate destination based on the additional information comprises deleting the reply message.

14. The method of claim 12 further comprising:
    using the stored association to divert additional messages from the source.

15. The method of claim 1, further comprising filtering the reply message with a filter.

16. The method of claim 15, wherein the filter is a spam filter.

17. The method of claim 15, wherein the filter is a language filter.

18. The method of claim 1, further comprising:
    stripping an origin from the at least one reply message;
    storing the at least one origin stripped reply message; and
    performing data analysis on the at least one stored origin stripped reply message.

19. A non-transitory computer readable storage medium, comprising executable instructions, which when executed by a computer, cause the computer to:
    register at least one enterprise origin identity in a messaging hub;
    provision at least one alternate destination device comprising:
        registering the at least one alternate destination device in the messaging hub; and
        associating it with the at least one enterprise origin identity;
    establish a connection between the messaging hub and an SMS interface;
    send an application to person (A2P) message;
    receive a reply message to the sent A2P message, directed to the enterprise origin identity;
    determine an alternate destination for the reply message;
    divert the reply message to the at least one alternate destination device;
    wherein the reply message is one of:
        an SMS message; and
        an MMS message;
    wherein the message interface is an SMS interface including at least one of:
        an SMS/MMS Gateway;
        an IP messaging Gateway; and
        an SMSC/MMSC; and
    store an association between a telephone number of the origin of the diverted reply message and the alternate destination.

* * * * *